United States Patent
Teranishi et al.

(10) Patent No.: US 10,492,514 B2
(45) Date of Patent: Dec. 3, 2019

(54) SAPONIN-CONTAINING, BEER-TASTE BEVERAGES

(75) Inventors: Takeshi Teranishi, Tokyo (JP); Itsuki Motohashi, Tokyo (JP); Mai Kitsukawa, Tokyo (JP)

(73) Assignee: SUNTORY HOLDINGS LIMITED, Osaka-shi, Osaka (JP)

( * ) Notice: Subject to any disclaimer, the term of this patent is extended or adjusted under 35 U.S.C. 154(b) by 167 days.

(21) Appl. No.: 14/131,992

(22) PCT Filed: Aug. 27, 2012

(86) PCT No.: PCT/JP2012/071551
§ 371 (c)(1),
(2), (4) Date: Jan. 10, 2014

(87) PCT Pub. No.: WO2013/031713
PCT Pub. Date: Mar. 7, 2013

(65) Prior Publication Data
US 2014/0154376 A1    Jun. 5, 2014

(30) Foreign Application Priority Data
Sep. 2, 2011    (JP) ................. 2011-191693

(51) Int. Cl.
| | |
|---|---|
| A23L 2/58 | (2006.01) |
| C12G 3/025 | (2019.01) |
| C12G 3/04 | (2019.01) |
| A23L 2/52 | (2006.01) |
| A23L 2/56 | (2006.01) |

(52) U.S. Cl.
CPC ............ *A23L 2/58* (2013.01); *A23L 2/52* (2013.01); *A23L 2/56* (2013.01); *C12G 3/025* (2013.01); *C12G 3/04* (2013.01)

(58) Field of Classification Search
None
See application file for complete search history.

(56) References Cited

U.S. PATENT DOCUMENTS

| | | | | | |
|---|---|---|---|---|---|
| 4,416,700 | A | * | 11/1983 | Clark | A23G 3/32 127/34 |
| 4,528,200 | A | * | 7/1985 | Coleman | A23F 5/267 426/250 |
| 2002/0102345 | A1 | | 8/2002 | Ramirez | |
| 2005/0220935 | A1 | * | 10/2005 | Oono | C12G 3/02 426/11 |
| 2006/0016513 | A1 | * | 1/2006 | Oono | C12C 5/026 141/83 |
| 2008/0226799 | A1 | * | 9/2008 | Lee | A23L 2/56 426/590 |
| 2008/0286421 | A1 | * | 11/2008 | DeLease | A23C 9/1524 426/112 |
| 2010/0021583 | A1 | * | 1/2010 | Alarcon Camacho | C12C 5/02 426/12 |
| 2011/0262614 | A1 | * | 10/2011 | Hamajima | A23L 2/52 426/590 |
| 2012/0021110 | A1 | | 1/2012 | Katayama et al. | |
| 2012/0021116 | A1 | | 1/2012 | Itakura et al. | |
| 2012/0207909 | A1 | | 8/2012 | Itakura et al. | |
| 2012/0322750 | A1 | * | 12/2012 | Schrader | A23L 2/385 514/25 |
| 2013/0059058 | A1 | | 3/2013 | Umezawa et al. | |
| 2016/0066614 | A1 | | 3/2016 | Ito et al. | |

FOREIGN PATENT DOCUMENTS

| | | | | |
|---|---|---|---|---|
| CA | 2585245 A1 | * | 5/2006 | ............ C12C 5/00 |
| EP | 1518924 A1 | | 3/2005 | |
| JP | 08-131087 A | | 5/1996 | |
| JP | 3483849 B2 | * | 1/2004 | |
| JP | 2006-191934 A | | 7/2006 | |
| JP | 2006-314282 A | | 11/2006 | |
| JP | 2007-054049 A | | 3/2007 | |
| JP | 2007082538 A | | 4/2007 | |
| JP | 2008245538 A | | 10/2008 | |
| JP | 2010-130902 A | | 6/2010 | |
| JP | 2010-284153 A | | 12/2010 | |
| JP | 2011-072228 A | | 4/2011 | |
| JP | 2011-142922 A | | 7/2011 | |
| WO | WO-2009/078359 A1 | | 6/2009 | |

OTHER PUBLICATIONS

Yukiaki Natsume, "Why the third beers have a beer-taste?" Jan. 10, 2010, p. 40 (with partial English translation).
PCT/JP2012/071551—International Preliminary Report on Patentability dated Mar. 14, 2014.
"Low-alcohol beer", Wikipedia page, available at https://en.wikipedia.org/wiki/Low-alcohol_beer#Non-alcoholic_beer (last visited Jan. 12, 2017).
Beer Analysis Methods of BCOJ (2004, 11.1 Revised ed.) 7.2 Extracts (with partial translation).
Page 45 of English-German-Japanese Brewer's Dictionary, published on Feb. 15, 2004.
International Search Report dated Sep. 25, 2012 for PCT/JP2012/071551 filed Aug. 27, 2012.
Office Action issued in Indian Application No. 2330/CHENP/2014 dated Oct. 31, 2018.
EP Application No. 12828988.1—Supplementary European Search Report dated Feb. 19, 2015.
Japan Patent Office, Notification of Reason(s) for Revocation for Japanese Patent Opposition No. 2019-700206 (Japanese Patent No. 6391327), dispatched Jul. 26, 2019.

* cited by examiner

*Primary Examiner* — Tamra L. Dicus
(74) *Attorney, Agent, or Firm* — Drinker Biddle & Reath LLP

(57) ABSTRACT

The foam of colorant-containing, beer-taste beverages is whitened, specifically by incorporating saponins in the beverages.

10 Claims, No Drawings

SAPONIN-CONTAINING, BEER-TASTE BEVERAGES

CROSS REFERENCE TO RELATED APPLICATIONS

This application is the National Stage of International Application No. PCT/JP2012/071551, filed Aug. 27, 2012, and claims benefit of Japanese Application No. 2011-191693, filed on Sep. 2, 2011, all of which are herein incorporated by reference in their entirety.

TECHNICAL FIELD

The present invention relates to a method of whitening the foam of colorant-containing, beer-taste beverages, as well as beer-taste beverages that contain colorants and which yet produce white foam.

BACKGROUND ART

Colorants such as caramel colors are commonly used in foods. In some brands of beer-taste beverages, the percentage of malt use is made lower than in others, so it often occurs that the characteristic color that should result from the malt is not fully developed. To deal with this situation, colorants are sometimes added to beer-taste beverages.

SUMMARY OF INVENTION

Technical Problem

The present inventor found that beer-taste beverages to which colorants such as caramel colors were added produced foam having a characteristic color imparted by the colorants (ranging from yellow to khaki in the case of caramel colors). Since foam is an important element of beer-taste beverages and ordinary beers develop white foam, this tendency of the added colorants is not necessarily preferred from the viewpoint of appearance.

Solution to Problem

The present inventor made an intensive study in order to solve the above-described problem. As a result, the inventor has found that production of white foam is possible by incorporating saponins in colorant-containing, beer-taste beverages.

Briefly, the present invention concerns the following.

1. A beer-taste beverage comprising a saponin and a colorant.
2. The beer-taste beverage as recited in 1, wherein the colorant is a caramel color.
3. The beer-taste beverage as recited in 1 or 2, wherein the saponin content is at least 1 mg/L but not greater than 50 mg/L.
4. The beer-taste beverage as recited in any one of 1 to 3, wherein the saponin content is at least 1 mg/L but not greater than 20 mg/L.
5. The beer-taste beverage as recited in any one of 1 to 4, wherein the saponin content is at least 2 mg/L but not greater than 20 mg/L.
6. The beer-taste beverage as recited in any one of 1 to 4, wherein the saponin content is at least 1 mg/L but not greater than 8 mg/L.
7. The beer-taste beverage as recited in any one of 1 to 6, wherein the saponin content is at least 2 mg/L but not greater than 7 mg/L.
8. The beer-taste beverage as recited in any one of 1 to 7, wherein the colorant content is at least 10 mg/L but not greater than 20,000 mg/L.
9. The beer-taste beverage as recited in any one of 1 to 8, wherein the colorant content is at least 100 mg/L but not greater than 2,000 mg/L.
10. The beer-taste beverage as recited in any one of 1 to 9, wherein the colorant content is at least 100 mg/L but not greater than 1,000 mg/L.
11. The beer-taste beverage as recited in any one of 1 to 10, which contains the colorant in an amount that increases the chromaticity (EBC) of the beverage by at least 1 but not greater than 400.
12. The beer-taste beverage as recited in any one of 1 to 11, which contains the colorant in an amount that increases the chromaticity (EBC) of the beverage by at least 2 but not greater than 37.
13. The beer-taste beverage as recited in any one of 1 to 12, wherein the saponin is quillaja saponin.
14. The beer-taste beverage as recited in any one of 1 to 13, wherein the calorie content is at least 1 kcal/100 mL but not greater than 8 kcal/100 mL.
15. The beer-taste beverage as recited in any one of 1 to 14, wherein the amount of saccharides is at least 0.2 g/100 mL but not greater than 2 g/100 mL.
16. The beer-taste beverage as recited in any one of 1 to 15, wherein the total amount of extract components is at least 0.2 wt % but not greater than 2.1 wt %.
17. The beer-taste beverage as recited in any one of 1 to 16, which is a non-alcoholic, beer-taste beverage.
18. The beer-taste beverage as recited in 17, wherein the non-alcoholic, beer-taste beverage is a non-fermented, beer-taste beverage.
19. The beer-taste beverage as recited in any one of 1 to 18, wherein the percentage of malt use is not greater than 50%.
20. The beer-taste beverage as recited in any one of 1 to 19, which does not use malt as an ingredient.
21. The beer-taste beverage as recited in any one of 1 to 20, which does not use any ingredient derived from mugi such as malt.
22. A method of whitening the foam of a colorant-containing, beer-taste beverage, which comprises incorporating a saponin in the beverage.

Advantageous Effects of Invention

In accordance with the present invention, the foam of colorant-containing, beer-taste beverages can be whitened.

DESCRIPTION OF EMBODIMENT (Saponins)

The term "Saponins" is the general term for glycosides that are widely distributed in plants and which have a sugar side chain bound to a steroid or triterpenoid, and that form a colloidal aqueous solution having a distinctive foaming quality like soap. Saponins may be classified by origin into quillaja saponin, Anemarrhenae Rhizoma saponin, soybean saponin, carrot saponin, Platycodi Radix saponin, senega saponin, etc. In the present invention, any of these saponins may be used either independently or in combination with each other. Preferably, quillaj a saponin is used either independently or in combination with other saponin. Quillaja saponins are commercially available under various trade names such as QUILLAJANIN C-100 (Maruzen Pharmaceuticals Co., Ltd.) The saponins that may be used in the present invention include partially hydrolyzed saponins.

The content of saponins in the beer-taste beverages of the present invention is not limited as long as they contribute to the production of white foam by suppressing the color that is derived from the colorants in the beverages; however, it is preferably at least 1 mg/L, more preferably at least 2 mg/L, and even more preferably at least 4 mg/L. The upper limit of the saponin content is not particularly limited if it is greater than the amount that enables the production of white foam; however, from the viewpoints of cost and potential effects on scent and taste, the saponin content is preferably not greater than 1,000 mg/L, more preferably not greater than 50 mg/L, and most preferably not greater than 20 mg/L. Alternatively, the saponin content may be not greater than 8 mg/L or not greater than 7 mg/L. It should be noted that all numerical ranges that satisfy any of the upper and lower limits indicated above can be adopted. Hence, an exemplary range is at least 1 mg/L but not greater than 1,000 mg/L, and another applicable range is at least 1 mg/L but not greater than 50 mg/L, or at least 1 mg/L but not greater than 20 mg/L. Alternatively, the range may be at least 1 mg/L but not greater than 8 mg/L or at least 2 mg/L but not greater than 7 mg/L.

The method of measuring the saponin content is not particularly limited and it can be measured by, for example, gas chromatography or HPLC. In the case of quillaja saponins, they can be quantified by the method described on pages 305-307 of the 8th edition of the Japanese Standards of Food Additives (2007).

(Colorants)

In the present invention, any of the colorants that are approved as food additives may be employed. From the viewpoint of addition to beverages, it is particularly preferred to use water-soluble colorants or highly hydrophilic colorants. It is also possible to use colorants that can effectively provide beer-like colors. Among others, caramel colors are especially preferred since they satisfy all of these conditions.

In the present invention, any substances known as caramel colors can be used. For example, caramel colors are classified by production method into classes I, II, III, and IV, and any of these may be used.

Given below are the definitions of the respective classes of caramel colors according to the Japanese Standards of Food Additives (1999).

Class I caramel color: This product is obtained by heat treatment of a starch hydrolysate, molasses or sugars as an edible carbohydrate, optionally in the presence of an added acid or alkali but without using a sulfurous acid compound or an ammonium compound.

Class II caramel color: This product is obtained by heat treatment of a starch hydrolysate, molasses or sugars as an edible carbohydrate in the presence of a sulfurous acid compound, optionally together with an added acid or alkali but without using an ammonium compound.

Class III caramel color: This product is obtained by heat treatment of a starch hydrolysate, molasses or sugars as an edible carbohydrate in the presence of an ammonium compound, optionally together with an added acid or alkali but without using a sulfurous acid compound.

Class IV caramel color: This product is obtained by heat treatment of a starch hydrolysate, molasses or sugars as an edible carbohydrate in the presence of both a sulfurous acid compound and an ammonium compound, optionally together with an added acid or alkali.

In the present invention, any class of caramel colors may be used but from the viewpoint of imparting a beer-like color or from the viewpoints of cost, easy availability, and the significant effect that can be obtained, caramel colors of class I, class II, or class IV can preferably be used, and caramel colors of class I or class IV can be used more preferably, and caramel colors of class I can be used most preferably. As for the color intensity of caramels, various values may be chosen.

In the present invention, the contents of colorants such as caramel colors to be incorporated in the beer-taste beverages are not particularly limited, and for the lower limit, the contents are preferably at least 10 mg/L, more preferably at least 100 mg/L, even more preferably at least 200 mg/L, and still more preferably at least 300 mg/L. For the upper limit, the contents are preferably not greater than 20,000 mg/L, more preferably not greater than 2,000 mg/L, and even more preferably not greater than 1,000 mg/L. It should be noted that all numerical ranges that have any of the upper and lower limits indicated above can be adopted. Hence, an exemplary range is at least 10 mg/L but not greater than 20,000 mg/L, and another applicable range is at least 100 mg/L but not greater than 2,000 mg/L, at least 100 mg/L but not greater than 1,000 mg/L, at least 200 mg/L but not greater than 1,000 mg/L, or at least 300 mg/L but not greater than 1,000 mg/L.

Although the contents of colorants such as caramel colors to be incorporated in the beer-taste beverages are not particularly limited in the present invention, the beer-taste beverages of the present invention may contain the colorants in such amounts that the chromaticity (EBC) of the beverage is increased by a certain degree. For the lower limit, the increase in the chromaticity (EBC) in the process is preferably at least 1, more preferably at least 2, whereas for the upper limit the increase is preferably not greater than 400, more preferably not greater than 40, even more preferably not greater than 37, and still more preferably not greater than 18. All numerical ranges that have any of the upper and lower limits indicated above can be adopted. Hence, the degree of increase in chromaticity (EBC) may be adjusted to range preferably a least 1 but not greater than 400, more preferably at least 1 but not greater than 40, even more preferably at least 2 but not greater than 37, and still more preferably at least 2 but not greater than 18.

It should be noted that chromaticity measurement can be performed by any suitable method such as the one specified by the European Brewery Convention (abbreviated as EBC.)

The method of checking to see if colorants such as caramel colors are used and the method of measuring their contents are not particularly limited and they can be measured by, for example, gas chromatography or HPLC. Methods such as the quantitative assays, qualitative assays, verification assays and purity test assays that are described in various official compendiums may be applied with suitable adaptations or, alternatively, known documented methods may also be used with appropriate improvements. The necessary information can also be obtained from the labeling on products, the disclosure of product brochures, and from production instructions, production records, or permission/authorization documents.

(Beer-Taste Beverages)

The term "beer-taste beverages" as used herein refers to carbonated drinks having a beer-like flavor. Thus, unless otherwise noted, beer-taste beverages as referred to herein embrace all types of carbonated drinks with a beer flavor whether or not they are produced via a yeast-based fermentation step. The beer-taste beverages of the present invention embrace not only those which contain alcohol (hereinafter sometimes designated as "alcoholic, beer-taste beverages" or "alcoholic beverages") but also those which are substantially free of alcohol (hereinafter sometimes designated as "non-alcoholic, beer-taste beverages" or "non-alcoholic beverages"). An example of the non-alcoholic, beer-taste beverages of the present invention is beer-taste soft drinks.

The alcohol content of the beer-taste beverage of the present invention is not particularly limited but is preferably not greater than 10%, more preferably not greater than 8%, and even more preferably it is at least 3% but not greater than 7%. If the beer-taste beverage is a low-alcohol or non-alcoholic beverage, its alcohol content is typically not greater than 1.0%, or not greater than 0.5%, or not greater than 0.005%, even sometimes the beverage is substantially free of alcohol. In the case where the beer-taste beverage of the present invention is substantially alcohol-free (i.e., non-alcoholic beverage), beer-taste beverages which contain alcohol in a trace amount that is too small to be detected are within the scope of the non-alcoholic beverage of the present invention. Included within the scope of the non-alcoholic beverage of the present invention are beverages the alcohol content of which is calculated to be 0.0%, in particular, 0.00% by counting fractions of 5 and over as a unit and cutting away the rest.

The "alcohol content" in the beer-taste beverage of the present invention refers to the content of alcohol (v/v %) in the beverage and can be measured by any known method, as by using a vibrating densimeter. Specifically, the beverage is filtered or sonicated to remove carbon dioxide; the $CO_2$-free sample is distilled under direct fire and the density at 15° C. of the resulting distillate is measured and converted to an alcohol content by looking at Table 2 which is titled "Conversion Between Alcohol Content and Density (15° C.) or Specific Gravity (15/15° C.)" and annexed to Analysis Methods Prescribed by the National Tax Agency (National Tax Agency Directive No. 6 in 2007, revised Jun. 22, 2007.) If the alcohol content is as low as less than 1.0%, a commercial apparatus for alcohol measurement or gas chromatography may be employed.

The beer-taste beverages of the present invention can be produced by ordinary methods known to skilled artisans. For example, at least one ingredient selected from among mugi such as malt, other cereal grains, starches and sugars, as well as other ingredients such as bitterness imparting agents and colorants are charged into a mashing kettle or tank where gelatinization and saccharification are performed, optionally in the presence of an added enzyme such as amylase; the saccharified mash is then filtered, boiled in the presence of optionally added hops, and transferred to a clarification tank to remove solids such as coagulated proteins. The saccharification, boiling and solids removal steps may be performed under known conditions.

To produce alcoholic beverages, yeast is subsequently added for fermentation and then removed by a filter machine or other means. Fermentation may be performed under known conditions. If necessary, the alcohol concentration may be reduced by a known method such as membrane treatment or dilution. Alternatively, the fermentation step may be replaced by addition of an alcoholic ingredient such as spirits. Subsequently, storage, optional addition of carbon dioxide, filtration, packaging, and optional sterilization are performed to produce alcoholic, beer-taste beverages.

Since it is difficult to achieve complete removal of alcohol from the beverage that has been subjected to the step of fermentation with yeast, non-alcoholic beverages, especially those the alcohol content of which is calculated to be 0.00% by counting fractions of 5 and over as a unit and cutting away the rest are preferably produced by a non-fermenting process that will not generate alcohol. For example, without performing the fermentation step but immediately following the above-described solids removal step, storage, addition of carbon dioxide, filtration, packaging, and optional sterilization steps are performed to produce non-fermented, non-alcoholic, beer-taste beverages.

Saponins and colorants may be added during any one of the steps mentioned above.

In the present invention, various ingredients may, if necessary, be used additionally to such an extent that they will not be deleterious to the desired effects of the invention. Examples include sweeteners, flavors, yeast extracts, and plant protein- and peptide-containing substances such as corn and soybean, proteinaceous substances such as bovine serum albumin, seasonings such as dietary fiber and amino acids, antioxidants such as ascorbic acid, and various acidulants, and these additives may optionally be used to such an extent that they will not be deleterious to the desired effects of the invention. There is a tendency to produce beer-taste beverages having a scent and taste that are similar to those of beer, so hops are desirably used as an ingredient. If hops are to be used, ordinary pelletized hops, powdered hops, and hop extracts that are used in the manufacture of beer and like beverages can be used as selected appropriately for the desired scent and taste. Processed hops such as isomerized hops and reduced hops may also be used. These are all encompassed by the hops to be used in the present invention. The amount of hops to be added is not particularly limited and it is typically at least about 0.0001 wt % but not greater than about 1 wt % of the total quantity of the beverage.

(mugi)

The term "mugi" as used herein means mugi (usually its berry) that is employed in producing ordinary beers and happoshu as well as their processed products, and malt is included within the definition of mugi.

Mugi other than malt that are employed as ingredients in the present invention may be exemplified by such mugi as yet-to-be-germinated barley, wheat, rye, karasumugi (white oats), oats, hatomugi (Job's-tears), and embaku (oats). Among others, yet-to-be-germinated barley can be used with advantage. These ingredients can be used either independently or in combination. They can even be used in combination with malt.

Yet-to-be-germinated mugi can also be used as decomposition products of mugi which are obtained by preliminarily breaking down mugi with externally-added or malt-derived enzymes. Decomposition products of mugi as used in the present invention are obtained by liquefying and saccharifying mugi enzymatically and then concentrating the resulting saccharified liquid. To effect enzymatic liquefaction, α-amylase is mainly used. For efficient liquefaction, α-amylase is preferably used in combination with β-glucanase. To break down the proteins in mugi, proteases may also be added. For saccharization, α-amylase is used, optionally in combination with β-amylase, glucoamylase, pullulanase, etc. After the enzymatic reaction with α-amylase, heating and concentration are carried out to yield the decomposition product of mugi to be used in the present invention. Among the various decomposition products of mugi, decomposed barley can be used with particular advantage. Barley to be used to make decomposed barley is not particularly limited if it is yet to be germinated and while any edible variety of barley may be used, the varieties used in malt production are preferred.

As used herein, malt is a product obtained by germinating the seeds of mugi such as barley, wheat, rye, karasumugi (oats), oats, hatomugi (Job's-tears), and embaku (oats), drying the sprouts, and removing their roots. The geographic regions of malt production are not particularly limited, either. It is particularly preferred to use barley malt. In the present invention, not only regular malt but also dark colored malt may be used.

(Preferred Modes of the Beer-Taste Beverage of the Invention)

1) Beer-Taste Beverage with Low Percentage of Malt Use

One of the preferred modes of the beer-taste beverage of the present invention is one with low percentage of malt use. This type of beverage may be fermented or non-fermented. An example is a beer-taste beverage with the percentage of malt use being not greater than 50%, preferably not greater than 25%. The "percentage of malt use" is also called percent malt and refers to the weight percentage of malt in ingredients other than water and hops, as exemplified by malt, rice, maize, kaoliang, potato, starch, mugi other than malt, and sugars. Since this type of beverage contains relatively small amounts of malt-derived ingredients, there is a great need to add ingredients having a coloring effect such as caramel colors in order to ensure that the beverage has a beer-like color. Hence, the inventive technology capable of whitening the foam can be used with advantage. On the other hand, as regards beers with high percentage of malt use, say, 100% malt use, there is not a particularly great need to use colorants and the foam produced has a white color which is inherent in beers; hence, the need to use the inventive technology is small.

2) Beer-Taste Beverage that does not Use Malt or Mugi

Another preferred mode of the beer-taste beverage of the present invention is one that does not use malt. This type of beverage may be fermented or non-fermented. Examples are beer-taste beverages that are made from mugi other than malt, cereal grains such as rice, corn, soybean, and pea, or a sugary liquid. Since this type of beverage contains extremely small amounts of malt-derived ingredients, there is an even greater need to add ingredients having a coloring effect such as caramel colors in order to ensure that the beverage has a beer-like color. Hence, the inventive technology capable of whitening the foam can be used with advantage. Yet another preferred mode of the beer-taste beverage of the present invention may be one that does not use mugi such as malt. This type of beverage may be fermented or non-fermented. In this case, too, the inventive technology can be used with advantage for the same reason as described above.

3) Low-Saccharide, Low-Calorie or Low-Extract Component, Beer-Taste Beverage

Still another preferred mode of the beer-taste beverage of the present invention is a low-saccharide, low-calorie or low-extract component, beer-taste beverage. This type of beverage may be fermented or non-fermented. In order to realize those features, the beverage itself or its ingredients are oftentimes diluted with water. In this case, the components derived from the ingredients are more diluted than those in ordinary beer-taste beverages, so there is a great need with the beverage of interest to add ingredients having a coloring effect such as caramel colors in order to ensure that the beverage has a beer-like color. Hence, the inventive technology capable of whitening the foam can be used with advantage.

The content of saccharides in the low-saccharide, beer-taste beverage of the present invention is preferably not greater than 2.0 g/100 mL or 2 g/100 mL and its lower limit is preferably 0.04 g/100 mL, more preferably 0.2 g/100 mL. The amount of saccharides is more preferably at least 0.2 g/100 mL but not greater than 2.0 g/100 mL or 2 g/100 mL, even more preferably at least 0.25 g/100 mL but not greater than 2.0 g/100 mL or 2 g/100 mL, and it is still more preferably at least 0.25 g/100 mL but not greater than 0.9 g/100 mL.

The term "saccharides" as used herein refers to ones based on the Nutrition Labelling Standards for Foods (Health, Labor and Welfare Ministry Notice No. 176 in 2003). Specifically, saccharides are that part of a food which remains after proteins, lipids, dietary fiber, ash, acetic acid, alcohols, and water have been removed. The amount of saccharides in a food can be calculated by subtracting the amounts of proteins, lipids, dietary fiber, ash, and water from the weight of the food. In this case, the amounts of proteins, lipids, dietary fiber, ash, and water are measured by the methods set out in the Nutrition Labelling Standards. Specifically, the amount of proteins is measured by the nitrogen determination and conversion method, the amount of lipids by the ether extraction method, the chloroform/methanol mixed liquid extraction method, the Gerber method, the acid decomposition method or the Roese-Gottlieb method, the amount of dietary fiber by high-performance liquid chromatography or the Prosky method, the amount of ash by the magnesium acetate addition ashing method, the direct ashing method or the sulfuric acid addition ashing method, and the amount of water by the Karl-Fischer method, the drying aid method, the method of drying by heating under reduced pressure, the method of drying by heating under atmospheric pressure, or the plastic film method.

The calorie content in the low-calorie, beer-taste beverage of the present invention is preferably not greater than 8 kcal/100 mL, more preferably at least 0.1 kcal/100 mL but not greater than 8 kcal/100 mL, even more preferably at least 1 kcal/100 mL but not greater than 8 kcal/100 mL, and still more preferably at least 1 kcal/100 mL but not greater than 5 kcal/100 mL. The calorie content in beverages is calculated basically in accordance with "On Analysis Methods, etc. for Nutrients, etc. Listed in the Nutrition Labelling Standards" as published in association with the Health Promotion Act; in principle, the determined amounts of the respective nutrients are multiplied by the associated energy conversion factors (4 kcal/g for proteins; 9 kcal/g for lipids; 4 kcal/g for saccharides; 2 kcal/g for dietary fiber; 7 kcal/g for alcohols; 3 kca/g for organic acids) and the products are added up to give the total number of calories. For details, see "On Analysis Methods, etc. for Nutrients, etc. Listed in the Nutrition Labelling Standards." Specific techniques for measuring the amounts of the respective nutrients contained in beverages may comply with the various methods of analysis described in "On Analysis Methods, etc. for Nutrients, etc. Listed in the Nutrition Labelling Standards" as a supplement to the Health Promotion Act. Alternatively, the Japan Food Research Laboratories (Foundation) will provide the necessary information about such calorific values and/or the amounts of the respective nutrients upon request.

The "low-extract component, beer-taste beverage" means beverages that contain only small amounts of extract components. For example, the total amount of extract components derived from all ingredients in that beverage is preferably at least 0.2 wt % but not greater than 3 wt %, more preferably at least 0.2 wt % but not greater than 2.1 wt %, even more preferably at least 0.3 wt % but not greater than 2.1 wt %, still more preferably at least 0.3 wt % but not greater than 1.4 wt %, yet more preferably at least 0.35 wt % but not greater than 1.4 wt %, further more preferably at least 0.4 wt % but not greater than 1.4 wt %, and still further more preferably at least 0.45 wt % but not greater than 1.1 wt %.

In the case of beverages having an alcohol content of at least 0.005%, the "amount of extract components" as used herein refers to the value of grams of extract components as specified in the Japanese Liquor Tax Act, namely, the nonvolatile matter contained in a unit volume of 100 cubic centimeters at a temperature of 15 degrees; in the case of beverages the alcohol content of which is less than 0.005%, the term refers to the extract level (wt %) in degassed samples as measured in accordance with "Beer Analysis Methods, 7.2 Extracts" specified by Brewery Convention of Japan (BCOJ) of Brewers Association of Japan. The methods of adjusting the amount of extract components are not particularly limited and examples that may be contemplated include adjusting the amount of mugi to be used as an ingredient or diluting the beverage.

4) Low-Saccharide, Low-Calorie or Low-Extract Component, Non-Alcoholic Beer-Taste Beverage Another preferred mode of the beer-taste beverage of the present invention is a low-saccharide, low-calorie or low-extract component, non-alcoholic beer-taste beverage. Non-alcoholic beer-taste beverages are beer-taste beverages that are substantially free of alcohol. A big challenge to the manufacture of non-alcoholic beer-taste beverages is that they give an impression that closely resembles beer under the condition that they contain no alcohol. In particular, beer-like foam is an important element that contributes a beer-like quality. Therefore, the technology of the present invention which is capable of producing as white foam as is obtained from beers can be applied to the non-alcoholic beer-taste beverage.

The non-alcoholic beer-taste beverage need not necessarily be produced via the fermentation step and, what is more, the absence of alcohol makes it possible to impart a healthy impression to the beverage. For example, a low-saccharide, low-calorie or low-extract component, non-alcoholic beer-taste beverage can be produced.

To make a non-alcoholic and low-extract component beer-taste beverage, the total amount of extract components can preferably be adjusted to at least 0.05 wt % but not greater than 2.3 wt %, more preferably to at least 0.2 wt % but not greater than 2.1 wt %, even more preferably to at least 0.2 wt % but not greater than 1.1 wt %, still more preferably to at least 0.2 wt % but not greater than 0.4 wt %, and yet more preferably to at least 0.2 wt % but not greater than 0.3 wt %.

To make a non-alcoholic and low-calorie beer-taste beverage, the calorie content per 100 mL of the beverage can preferably be adjusted to at least 0.2 kcal but not greater than 8 kcal, more preferably to at least 0.7 kcal but not greater than 8 kcal, even more preferably to at least 0.7 kcal but not greater than 4 kcal, still more preferably to at least 0.7 kcal but not greater than 1.6 kcal, and yet more preferably to at least 0.7 kcal but not greater than 1.2 kcal.

To make a non-alcoholic and low-saccharide beer-taste beverage, the amount of saccharides can preferably be adjusted to 0.1 g/100 mL but not greater than 3 g/100 mL, more preferably to at least 0.2 g/100 mL but not greater than 2 g/100 mL, even more preferably to at least 0.2 g/100 mL but not greater than 1 g/100 mL, still more preferably to at least 0.2 g/100 mL but not greater than 0.4 g/100 mL, and yet more preferably to at least 0.2 g/100 mL but not greater than 0.3 g/100 mL.

(Method of Whitening the Foam)

In the present invention, the foam of colorant-containing, beer-taste beverages is whitened by incorporating saponins in the beverages.

The whitening of the foam encompasses two approaches, one for suppressing the coloration of foam, and the other for whitening the foam as it is being produced or after it has been produced.

In the present invention, the content of saponins to be incorporated in the beer-taste beverage is not limited as long as the color of the foam derived from the colorants contained in the beverage can be suppressed or otherwise controlled to produce white foam. The content of saponins to be incorporated in the beer-taste beverage is preferably at least 1 mg/L, more preferably at least 2 mg/L, and even more preferably at least 4 mg/L. The upper limit of the saponin content is not particularly limited if it is greater than the amount that enables the production of white foam; however, from the viewpoints of cost and potential effects on scent and taste, the saponin content is preferably not greater than 1,000 mg/L, more preferably not greater than 50 mg/L, and most preferably not greater than 20 mg/L. Alternatively, the saponin content may be not greater than 8 mg/L or not greater than 7 mg/L. It should be noted that all numerical ranges that satisfy any of the upper and lower limits indicated above can be adopted. Hence, an exemplary range is from 1 mg/L to 1,000 mg/L, and another applicable range is from 1 mg/L to 50 mg/L, or from 1 mg/L to 20 mg/L. Alternatively, the range may be from 1 mg/L to 8 mg/L or from 2 mg/L to 7 mg/L. The contents of colorants such as caramel colors to be incorporated in the beer-taste beverages, as regards to their lower limit, are preferably at least 10 mg/L, more preferably at least 100 mg/L, even more preferably at least 200 mg/L, and still more preferably at least 300 mg/L. As regards to the upper limit, the contents are preferably not greater than 20,000 mg/L, more preferably not greater than 2,000 mg/L, and even more preferably not greater than 1,000 mg/L. It should be noted that all numerical ranges that have any of the upper and lower limits indicated above can be adopted. Hence, an exemplary range is from 10 mg/L to 20,000 mg/L, and another applicable range is from 100 mg/L to 2,000 mg/L, from 100 mg/L to 1,000 mg/L, from 200 mg/L to 1,000 mg/L, or from 300 mg/L to 1,000 mg/L. The beer-taste beverages may contain colorants such as caramel colors in such amounts that the chromaticity (EBC) of the beverage is increased by a certain degree. For the lower limit, the increase in the chromaticity (EBC) in the process is preferably at least 1, more preferably at least 2, whereas for the upper limit the increase is preferably not greater than 400, more preferably not greater than 40, even more preferably not greater than 37, and still more preferably not greater than 18. All numerical ranges that have any of the upper and lower limits indicated above can be adopted. Hence, the degree of increase in chromaticity (EBC) may be adjusted to range preferably from 1 to 400, more preferably from 1 to 40, even more preferably from 2 to 37, and still more preferably from 2 to 18.

As will be set out in the Examples, the color of foam can be evaluated by, for example, comparing it to the closest color on a JIS color chart.

The means for incorporating saponins in the beer-taste beverage is not particularly limited if a treatment is possible such that saponins are contained in the beverage at the time when the foam is to be whitened, and any of the methods known to the skilled artisan may be employed. The timing of incorporating saponins is not limited, either. For example, saponins may be added before, during or after any one of the steps involved in the production of beer-taste beverages, say, the aforementioned saccharification, boiling, or solids removal step. Saponins may be added either on their own or as incorporated in flavors.

(Packaged Beverages)

The beer-taste beverage of the present invention may be packaged in containers. The types of containers are in no way limited and glass bottles, cans, kegs, PET bottles and the like may be filled with the beverage and sealed to produce packaged beverages.

EXAMPLES

On the following pages, the present invention is described by means of examples, to which the invention is in no way limited.

Example 1

Production of Non-Alcoholic Beer-Taste Beverage of the Invention

A beer-taste beverage of the present invention was produced by the following method. Malt was used in 20 kg (60 wt % of which consisted of dark colored malt, or caramel malt). The malt was ground to an appropriate grain size, charged into a mashing vessel, and mixed with 120 L of warm water to prepare mash with about 50° C. After holding at 50° C. for 30 minutes, the temperature was slowly raised and saccharification was performed at 65-72° C. for 60 minutes. Upon completion of saccharification, the mash was heated to 77° C. and transferred to a wort filtration vessel, where it was filtered to form a filtrate.

A portion of the filtrate was mixed with warm water at a ratio that was so adjusted that upon completion of boiling, the amount of extract components would reach the desired level. At a production scale of 100 L, about 100 g of hops and about 40 g of a commercial caramel color (a class I caramel color) were added and the mixture was agitated. In the process, the chromaticity (EBC) increased by 8. Subsequently, the mixture was boiled at 100° C. for 80 minutes. Lees were separated from the boiled mixture, which was then cooled to about 2° C.; thereafter, antioxidants, flavors, acidulants (sufficient to lower pH to less than 4) and sweeteners were added in suitable amounts, and subsequently, a commercial saponin was added in an amount of about 5 mg/L of the product and the mixture was stored for about 24 hours. In the process, a suitable amount of carbon dioxide was added. Subsequent steps of filtration, bottling and sterilization (heating for 10 minutes at 65° C. and above) yielded a non-alcoholic beer-taste beverage of the present invention (Invention Product 1). The content of caramel color in the beverage was about 400 mg/L. The beverage of Invention Product 1 was alcohol-free, with the calorie content being 2 kcal/100 mL, the amount of saccharides being 0.4 g/100 mL, and the total amount of extract components being 0.4 wt %.

A non-alcoholic beer-taste beverage (Comparative Sample 1) was prepared by repeating the same procedure, except that no saponin was added.

A commercial beer (SUNTORY The PREMIUM MALT'S; 100% malt use, with no colorants added) was also evaluated as Reference Sample 1.

<Method of Evaluating the Color of Foam>

Each of the samples cooled to a suitable temperature (ca. 8° C.) in large bottles of beer (633 mL) was uncapped and poured into a 500-mL glass cylinder from a height of about 10 cm above the mouth of the cylinder in about 6 seconds in such a way that it would produce foam which rose to the level of 500 mL. Five minutes after the samples were poured in, the foam remaining within the cylinder was examined with the naked eye and the color on a JIS color chart (in accordance with JIS Z8102) that was the closest to the color of the foam was recorded. The results are shown in Table 1 below. The foam of Comparative Sample 1 was considerably pale yellow whereas the foam of Invention Product 1 was as white as the foam of Reference Sample 1; the addition of saponin contributed to a marked improvement in the color of foam. The beverage of Invention Product 1 was also preferred in scent and taste.

TABLE 1

|  | Invention Product 1 | Comparative Sample 1 | Reference Sample 1 |
| --- | --- | --- | --- |
| Beverage | Non-alcoholic, beer-taste beverage | Non-alcoholic, beer-taste beverage | Commercial beer (100% malt) |
| Caramel color | present | present | absent |
| Saponin | present | absent | absent |
| Color of foam | white | considerably pale yellow | white |

Example 2

Fermented, Beer-Taste Beverage

To 85 kg of mother water were added 7 kg of sugar syrup (Kato Kagaku Co., Ltd.), 70 g of decomposed corn proteins, 70 g of yeast extract, 40 g of caramel color, 100 g of hops and a specified amount of water-soluble vegetable fibers, and the resulting mixture was boiled for 50 minutes and left to stand; the suspended solid matter was removed to give a fermentation liquor. After adding sweeteners (acesulfame K and sucralose), an acidulant (citric acid), tripotassium citrate, starter alcohol, and flavors to the fermentation liquor, saponins were also added in an amount of about 5 mg/L of the product; thereafter, a yeast (Weihenstephan-34 strain) was added in such an amount that the live cell count would be $10 \times 10^6$ cells/mL, and fermentation was conducted at a temperature of 20° C. for 8 days. After the end of assimilation of the carbon sources, the yeast was filtered off to produce a fermented, beer-taste beverage with an alcohol content of 5% (Invention Product 2). The percentage of malt use in the beverage of Invention Product 2 was zero, so was the percentage of use of mugi such as malt.

The color of the foam in the obtained beverage was evaluated by the same method as in Example 1; as a result, the color of the foam was as white as the reference sample, and there was no problem. The beverage of Invention Product 2 was also preferred in scent and taste.

Example 3

Production of Non-Alcoholic Beer-Taste Beverage

Eight samples of a non-alcoholic beer-taste beverage of the present invention were prepared by incorporating a commercial saponin in amounts ranging from 1 to 50 mg/L of the product (Invention Products 3 to 10). The method of production was the same as in Example 1 except for the amount of saponin added. The content of caramel color in these beverage samples was about 400 mg/L, with a chromaticity (EBC) increase of 8. These beverage samples were alcohol-free, with the calorie content being 2 kcal/100 mL, the amount of saccharides being 0.4 g/100 mL, and the total amount of extract components being 0.4 wt %.

A non-alcoholic beer-taste beverage (Comparative Sample 2) was prepared by repeating the same procedure, except that no saponin was added.

<Method of Evaluating the Color of Foam>

The color of foam was evaluated by the same method as in Example 1. The results are shown in Table 2 below. The foam of Comparative Sample 2 was considerably pale yellow whereas Invention Products 3 to 10 produced white foam.

TABLE 2

|  | Comparative Sample 2 | Invention Product 3 | Invention Product 4 | Invention Product 5 | Invention Product 6 | Invention Product 7 | Invention Product 8 | Invention Product 9 | Invention Product 10 |
|---|---|---|---|---|---|---|---|---|---|
| Saponin content (mg/L) | 0 | 1 | 2 | 4 | 10 | 20 | 30 | 40 | 50 |
| Color of foam | Considerably pale yellow | white | white | white | white | white | white | white | white |

Example 4

Production of Fermented, Beer-Taste Beverage

A beer-taste beverage of Comparative Sample 3 was prepared by the method of Example 2, except that no saponin was added and that caramel color of type IV was used. To Comparative Sample 3, a saponin was added in amounts of 1 mg, 5 mg and 20 mg, respectively, per liter of the product and the mixtures were gently agitated to prepare Invention Products 11 to 13.

The color of foam was evaluated by the same method as in Example 1. The results are shown in Table 3 below. The foam of Comparative Sample 3 was considerably pale yellow whereas Invention Products 11 to 13 produced white foam. The beverages of Invention Products 11 to 13 were also preferred in scent and taste.

TABLE 3

|  | Comparative Sample 3 | Invention Product 11 | Invention Product 12 | Invention Product 13 |
|---|---|---|---|---|
| Saponin content (mg/L) | 0 | 1 | 5 | 20 |
| Color of foam | Considerably pale yellow | white | white | white |

Example 5

Study on Caramel Type

Samples of a non-alcoholic beverage of the present invention (Invention Products 14 and 15) were prepared as in Example 1, except that a caramel color of type II or IV was used. By repeating the same procedure except that no saponin was used, additional samples of a non-alcoholic beer-taste beverage were prepared (Comparative Samples 4 and 5). The color of foam from the prepared samples was evaluated by the same method as in Example 1. The results are shown in Table 4 below. Even when a caramel color of type II or IV was used, the foam of the comparative samples was considerably pale yellow whereas the invention products produced white foam.

TABLE 4

|  | Comparative Sample 4 | Invention Product 14 | Comparative Sample 5 | Invention Product 15 |
|---|---|---|---|---|
| Type of caramel | type II | type II | type IV | type IV |
| Saponin content (mg/L) | 0 | 5 | 0 | 5 |
| Color of foam | Considerably pale yellow | white | Considerably pale yellow | white |

Example 6

Production of Non-Alcoholic Beer-Taste Beverage

The amount of a caramel color (type I) added was varied stepwise from 0 mg/L to 2,000 mg/L, to prepare non-alcoholic beer-taste beverages, Comparative Sample 6 (caramel content: 0 mg/L), and Invention Products 16 to 19 (100 mg/L, 400 mg/L, 1,000 mg/L, and 2,000 mg/L). Namely, these non-alcoholic beer-taste beverages were prepared as in Example 1, except that the amount of a caramel color (type I) added was varied stepwise, and that the amount of saponin was 20 mg/L. The color of foam from the prepared samples was evaluated by the same method as in Example 1. The results are shown in Table 5 below. Invention Products 16 to 18 produced white foam, which was comparable to the white foam from Comparative Sample 6 which had no caramel color added thereto. Invention Product 19 produced yellowish white foam but it was apparently whiter than in the case where no saponin was added, for example, Comparative Sample 1 prepared in Example 1. Thus, Invention Products 16 to 19 all produced substantially white and, hence, preferred foam; what is more, they were also confirmed to be satisfactory as a beer-taste beverage in terms of scent and taste. Table 5 also indicates the chromaticity (EBC) of each sample, as well as the differences (the increases) in chromaticity that resulted from the addition of the caramel color.

TABLE 5

| (Results) | | | | | |
|---|---|---|---|---|---|
|  | Comparative Sample 6 | Invention Product 16 | Invention Product 17 | Invention Product 18 | Invention Product 19 |
| Caramel content (mg/L) | 0 | 100 | 400 | 1,000 | 2,000 |
| Chromaticity (EBC) | 4 | 6 | 11 | 23 | 41 |
| Increase in chromaticity (EBC) | 0 | 2 | 7 | 18 | 37 |
| Color of foam | white | white | white | white | yellowish white |

Example 7

Low-Extract Component, Low-Calorie, Low-Saccharide, Non-Alcoholic Beer-Taste Beverages Five samples of beer-taste beverage having different extract component contents were produced in accordance with the present invention. Malt was ground to an appropriate grain size, charged into a mashing vessel, and mixed with 120 L of warm water to prepare mash with about 50° C. After holding at 50° C. for 30 minutes, the temperature was slowly raised and saccharification was performed at 65-72° C. for 60 minutes. Upon completion of saccharification, the mash was heated to 77° C. and transferred to a wort filtration vessel, where it was filtered to form a filtrate.

A portion of the filtrate was mixed with warm water at a ratio that was so adjusted that upon completion of boiling, the amount of extract components would reach the desired levels. At a production scale of 100 L, about 100 g of hops was added and the mixture was boiled at 100° C. for 80 minutes. Lees were separated from the boiled mixture, which was then cooled to about 2° C.; thereafter, antioxidants, flavors, acidulants and sweeteners were added in suitable amounts, and a caramel color (a type I caramel color) was added in an amount of 200 mg/L of the product; furthermore, a saponin was added in an amount of 10 mg/L of the product, and the mixture was stored for about 24 hours. In the process, a suitable amount of carbon dioxide was added. Subsequent steps of filtration, bottling and sterilization (heating for 10 minutes at 65° C. and above) yielded Samples 1 to 5 of the non-alcoholic beer-taste beverage of the present invention.

The color of the foam from each of the samples was evaluated by the same method as in Example 1. The results are shown in Table 6 below; all samples used the caramel color and yet they produced white foam. What is more, they were satisfactory as a beer-taste beverage in terms of scent and taste.

TABLE 6

| | Sample 1 | Sample 2 | Sample 3 | Sample 4 | Sample 5 |
| --- | --- | --- | --- | --- | --- |
| Extract components (wt %) | 0.2 | 0.3 | 0.4 | 1.1 | 2.1 |
| Alcohol (v/v %) | 0.00 | 0.00 | 0.00 | 0.00 | 0.00 |
| Chromaticity (EBC) | 8 | 8 | 8 | 8 | 8 |
| Calorie (kcal/100 mL) | 0.7 | 1.2 | 1.6 | 4.4 | 8.4 |
| Saccharides (g/100 mL) | 0.2 | 0.3 | 0.4 | 1 | 2 |
| Color of foam | white | white | white | white | white |

The invention claimed is:

1. A carbonated, beer-taste beverage comprising a saponin and a caramel color as a colorant, wherein a content of the saponin is at least 1 mg/L but not greater than 8 mg/L, wherein a content of the caramel color is at least 10 mg/L but not greater than 1,000 mg/L, wherein the beverage is prepared by using at least a mugi material and hops, and wherein the alcohol content of the beverage is not greater than 1.0%.

2. The carbonated beverage as recited in claim 1, wherein the content of the saponin is at least 2 mg/L but not greater than 7 mg/L.

3. The carbonated beverage as recited in claim 1, wherein the content of the caramel color is at least 100 mg/L but not greater than 1,000 mg/L.

4. The carbonated beverage as recited in claim 1, wherein the saponin is quillaja saponin.

5. The carbonated beverage as recited in claim 1, wherein the beverage has a calorie content of at least 1 kcal/100 mL but not greater than 8 kcal/100 mL.

6. The carbonated beverage as recited in claim 1, further comprising saccharides in the range of at least 0.2 g/100 mL but not greater than 2 g/100 mL.

7. The carbonated beverage as recited in claim 1, further comprising extract components in the range of at least 0.2 wt % but not greater than 2.1 wt %,
   wherein a total amount of extract components refers to a value of grams of nonvolatile matters contained in a unit volume of 100 cubic centimeters at a temperature of 15° C., if the carbonated beverage has an alcohol content of at least 0.005%, or
   wherein a total amount of extract components refers to an extract level (wt %) in the carbonated beverage, after being degassed, as measured in accordance with "Beer Analysis Methods, 7.2 Extracts" specified by Brewery Convention of Japan (BCOJ) of Brewers Association of Japan, if the carbonated beverage has an alcohol content of less than 0.005%.

8. The carbonated beverage as recited in claim 1, which is a non-alcoholic beverage.

9. The carbonated beverage as recited in claim 8, wherein the beverage is a non-fermented beverage.

10. The carbonated beverage as recited in claim 1, wherein the carbonated beverage is produced by the following steps:
    (a) obtaining the saccharified mash by conducting gelatinization and saccharification of the mugi material;
    (b) filtering the saccharified mash to obtain a filtrate;
    (c) adding the caramel color and the hops to the filtrate to obtain a mixture;
    (d) boiling the mixture and removing solids from the boiled mixture to obtain a solution;
    (e) adjusting the solution by adding the saponin; and
    (f) adding carbon dioxide to the adjusted solution, filtering, and sterilizing to obtain the carbonated beverage,
    wherein an amount of the caramel color is added so that the carbonated beverage has the content of the caramel color of at least 10 mg/L but not greater than 1,000 mg/L, and wherein an amount of the saponin is added so that the carbonated beverage has the content of the saponin of at least 1 mg/L but not greater than 8 mg/L.

* * * * *